Figure 1:
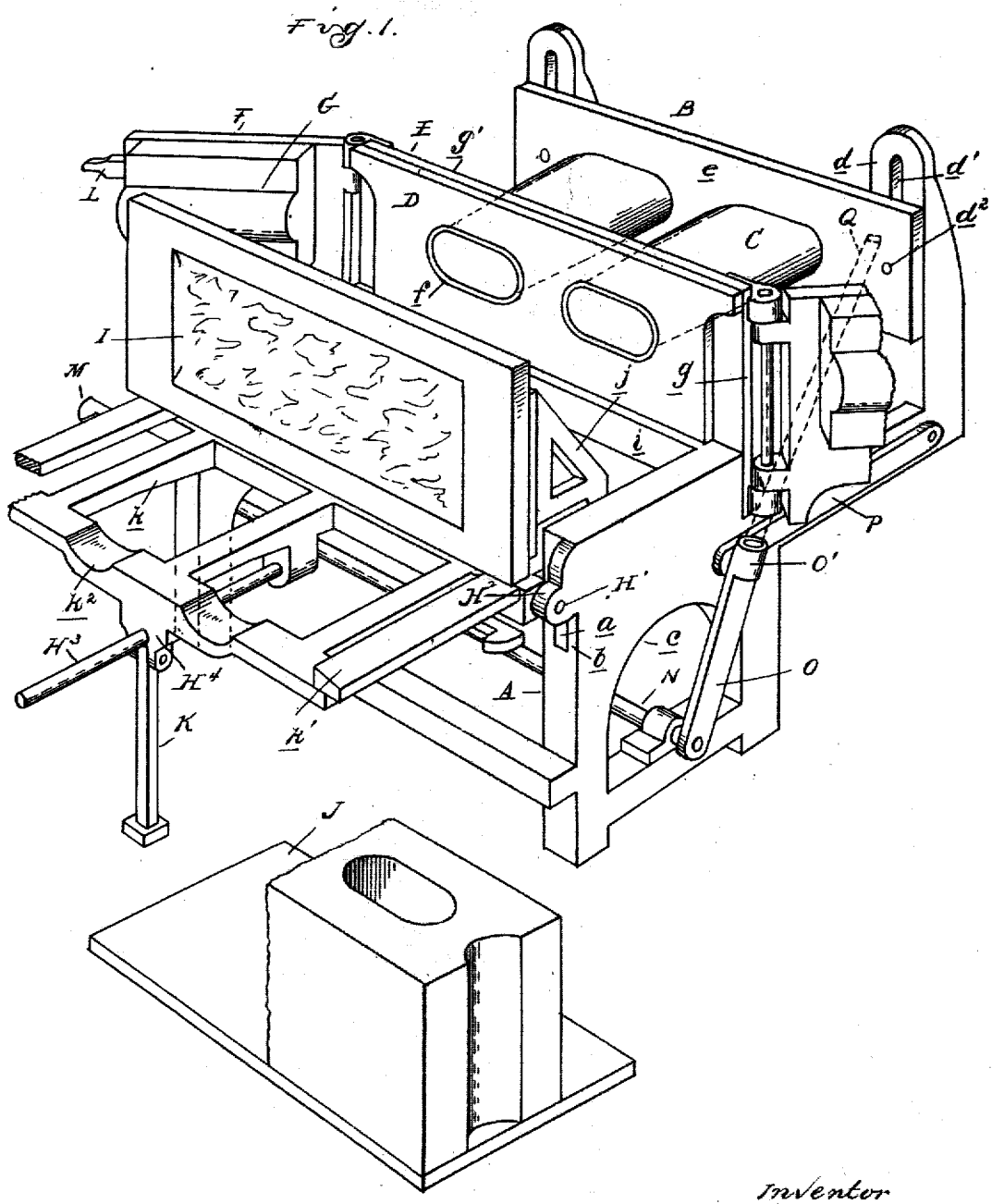

No. 826,599. PATENTED JULY 24, 1906.
L. P. NORMANDIN.
MACHINE FOR MOLDING BUILDING BLOCKS.
APPLICATION FILED JUNE 17, 1905.

3 SHEETS—SHEET 1.

Witnesses
Inventor
Levi P. Normandin

No. 826,599. PATENTED JULY 24, 1906.
L. P. NORMANDIN.
MACHINE FOR MOLDING BUILDING BLOCKS.
APPLICATION FILED JUNE 17, 1905.
3 SHEETS—SHEET 2.
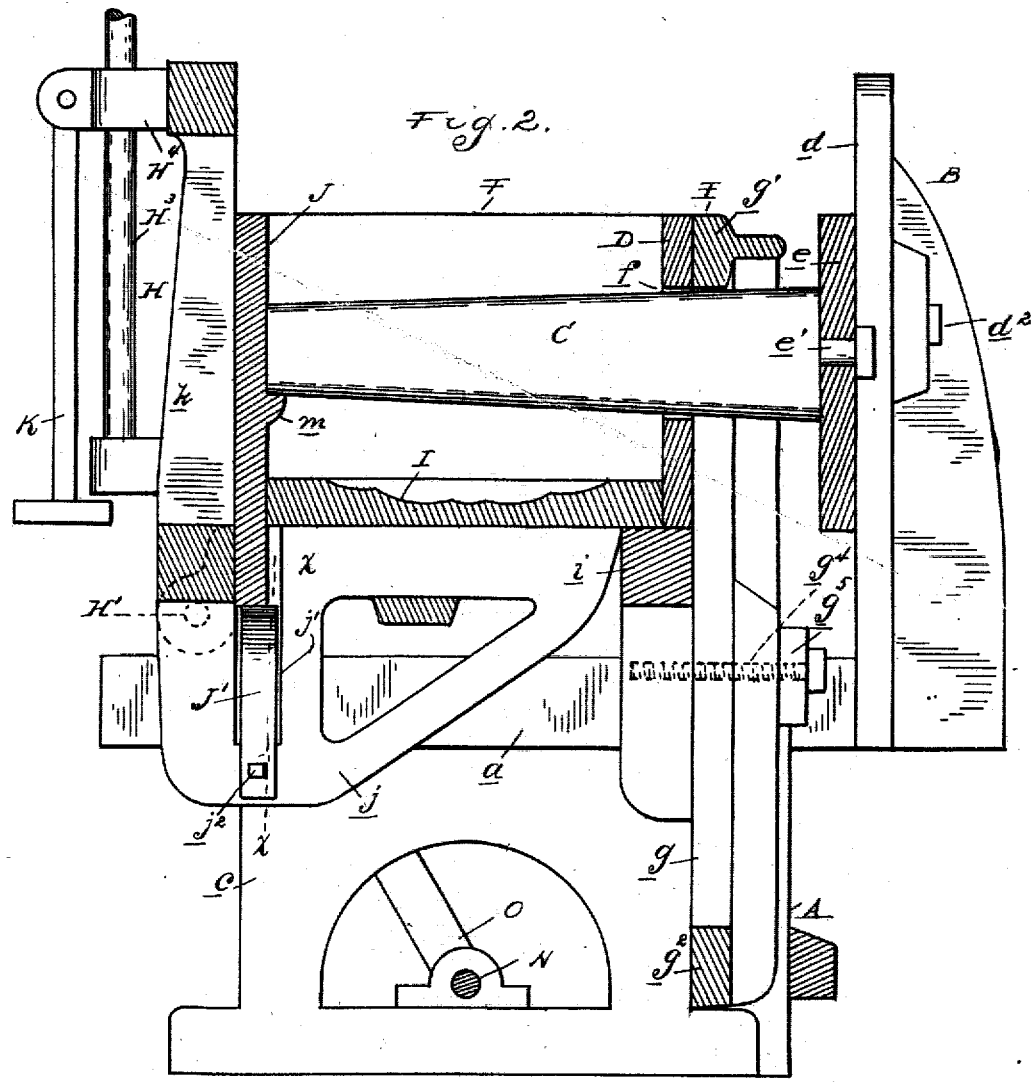
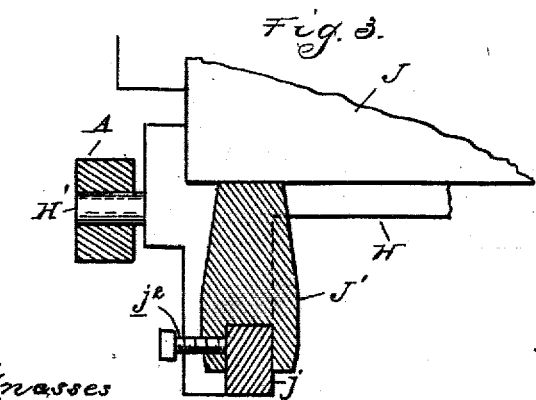
Witnesses
Inventor
Levi P. Normandin
By James Whittmore
atty.

No. 826,599. PATENTED JULY 24, 1906.
L. P. NORMANDIN.
MACHINE FOR MOLDING BUILDING BLOCKS.
APPLICATION FILED JUNE 17, 1905.
3 SHEETS—SHEET 3.
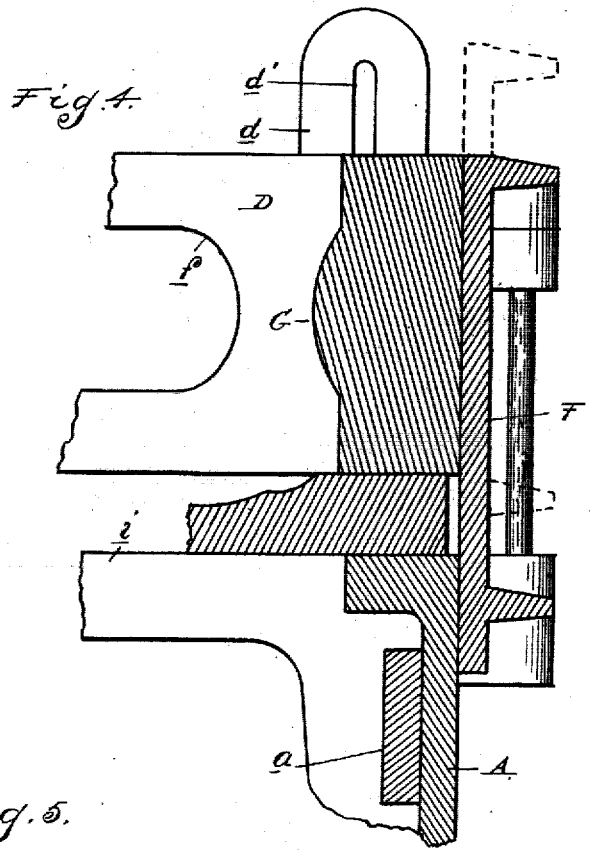
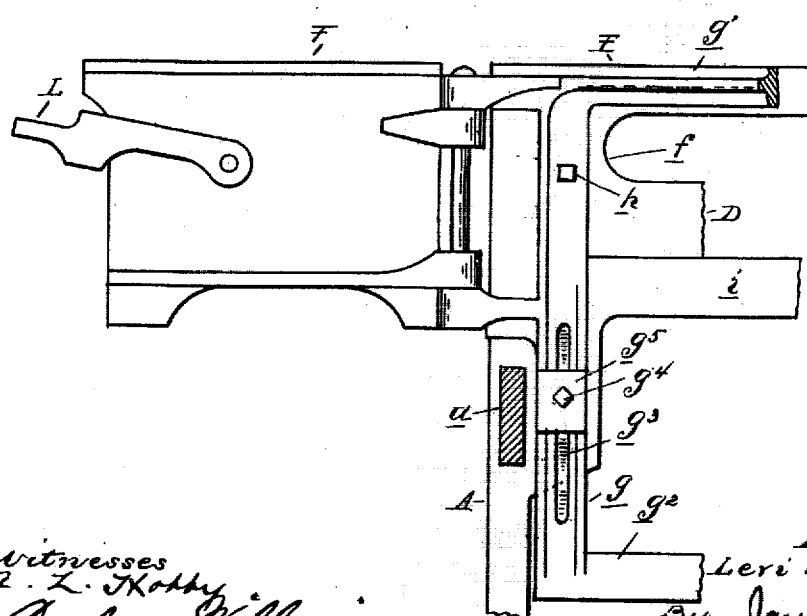
Witnesses
A. L. Kotty
Amelia Williams
Inventor
Levi P. Normandin
By James Whitmore
Atty.

UNITED STATES PATENT OFFICE.

LEVI P. NORMANDIN, OF JACKSON, MICHIGAN, ASSIGNOR TO WILLIAM F. COWHAM, OF JACKSON, MICHIGAN.

MACHINE FOR MOLDING BUILDING-BLOCKS.

No. 826,599.        Specification of Letters Patent.        Patented July 24, 1906.

Application filed June 17, 1905. Serial No. 265,774.

*To all whom it may concern:*

Be it known that I, LEVI P. NORMANDIN, a citizen of the United States, residing at Jackson, in the county of Jackson and State of Michigan, have invented certain new and useful Improvements in Machines for Molding Building-Blocks, of which the following is a specification, reference being had therein to the accompanying drawings.

The invention relates to machines for molding blocks of that type known as "face down" and in which the bottom plate of the mold during the molding operation forms the front face of the block as placed in the wall.

The invention consists in certain novel features of construction as hereinafter set forth.

In the drawings, Figure 1 is a perspective view of the machine with the parts in position for the removal of the molded block. Fig. 2 is a cross-section through the machine with the parts in position for molding. Fig. 3 is a detail section on line $xx$ of Fig. 2. Fig. 4 is a section taken in a plane transverse to that of Fig. 2, illustrating the hinged end plates of the mold. Fig. 5 is a rear elevation of Fig. 4 with the hinged end plate in open position.

In the molding of building-blocks it is customary to vary the width of the block according to the thickness of the wall desired, but the other dimensions—*i. e.*, the length and the height—are generally maintained the same for all full blocks. It is also customary in the molding of blocks to support them both during the molding operation and subsequently while the cement is setting upon bottom plates or pallets. These pallets must form a complete face for the mold, and consequently the pallet must vary in width for each adjustment in the width of the mold. Therefore it is necessary to provide each machine with a large number of pallets of different widths corresponding to the different widths of blocks to be molded.

It is one of the objects of the present invention to reduce the number of pallets necessary for the machine.

It is a further object of the invention to provide means for quickly adjusting the mold for different widths of block, and, further, to facilitate the quick removal of the block when molded.

As shown, A is a suitable frame or bed for supporting the mold.

B is a frame mounted upon the frame A to slide laterally in relation thereto, preferably comprising the horizontal bars $a$, slidable in bearings $b$ in the end frame $c$ of the main frame or bed A. The bars $a$ are provided with uprights $d$ at their outer ends, and extending between these uprights is a cross-bar $e$, which is vertically adjustable, preferably by providing slots $d'$ in the uprights, through which the clamping-bolts $d^2$ for the bar $e$ pass.

C represents cores which are adjustably secured to the cross-bar $e$ and extend laterally therefrom over the bed or main frame A. These cores are secured to the cross-bar $e$ by clamping-bolts $e'$ and may be adjusted longitudinally of the bar by suitable means, such as slotting the bar or providing a series of apertures therein with which the bolts $e'$ engage. Thus by adjusting the clamping-bolts $e'$ and $d^2$ the cores C may be shifted in position, either longitudinally of the block or vertically with respect to the bed, the latter adjustment being for forming blocks of different widths.

Parallel to the cross-bar $e$ at one side of the main frame A is a plate D, which forms one face of the mold and is apertured at $f$ for the passage of the cores C. As this plate must vary in height in the arrangement of the core-opening $f$ for each adjustment of the cores vertically or longitudinally, it is preferably detachably connected to an upright supporting-frame E. This supporting-frame, as illustrated in Fig. 5, comprises the vertical side bars $g$ and top and bottom bars $g'$ and $g^2$. The side bars $g$ are vertically slotted at $g^3$ for the passage of clamping-bolts $g^4$, which, with clamping-plates $g^5$, fasten the frame E to the frame A. The plate D is secured to the frame E by any suitable means, such as the securing-screws $h$, and when in position its lower edge will rest directly upon the top bar $i$ of the frame A. Thus where a different width of plate D is to be used it may be quickly secured to the frame E and the latter adjusted vertically until the bottom edge of the plate D rests on the bed, as just described.

In addition to supporting the plate D the frame E forms the means of supporting the end plates of the mold. These end plates F are preferably hinged to the frame E, and inasmuch as the ends of the mold must vary correspondingly to each variation in width of the plate D, I preferably form the plates F of maximum width and secure thereto detachable lining-plates G of variable width. The plates F are arranged to swing against the ends of the main frame A, while the lining-plate G projects inward over the top of said main frame. By this arrangement I avoid the necessity of changing the plates F for different sizes of block, it being only necessary to replace the lining-plates G by others of suitable dimension.

To complete the mold, another plate parallel to the plate D and a plate arranged horizontally are necessary. The two plates are preferably secured to a common supporting member H, which is pivotally secured to the main frame A, so as to be capable of a partial rotation. As illustrated in Fig. 2, this pivoted supporting-frame H comprises the end brackets $j$, which extend horizontally in the position shown in Fig. 2, and the skeleton frame $k$, which extends vertically in the same figure, perpendicular to the brackets $j$. To the brackets $j$ is detachably secured a plate I, which forms the bottom of the mold in molding position, but the side face of the block as it is arranged in the wall. As shown, the plate I is fashioned to produce a rock-face appearance; but it may be of any suitable design or plain, as desired. The vertically-extending frame $k$ forms the support for a plate J, which constitutes the pallet upon which the molded block is removed from the machine.

As has been stated, it is an object of the invention to reduce the number of different sizes of pallets for use in molding different sizes of blocks. This is accomplished by providing the brackets $j$ with slots $j'$, in which the pallets J may be inserted and by arranging said pallets so as to overlap the edge of the mold-plate I. Thus it is not necessary to change the width of the plate J for each adjustment in the width of the block, and it is immaterial as to whether a narrow block is molded with a pallet of the same width or one of considerably greater width. Where narrower plates J are used, these may be supported by detachable blocks J', which are bifurcated to embrace the bracket $j$ and are secured thereto by set-screws $j^2$.

The frame H is pivoted to the frame A, preferably by stub-shafts H', extending therefrom and engaging with bearings H² on the main frame A. These pivots permit of partially rotating the frame H, the purpose of which is to change the block from the face-down position in which it is molded to the upright position in which it is supported on the pallet J. This partial rotation of the frame may be accomplished by the operator by the use of a suitable lever, such as H³, which is slidingly secured in bearings H⁴ on the frame H and may be drawn outward into position for use. For supporting the frame H when rocked as described a leg K is pivotally secured to the outer end of the frame $k$ and will swing during the turning of the frame H into the position shown in Fig. 1. Thus the molded block may be turned into upright position very quickly and with very little effort on the part of the operator.

The pallets J are preferably arranged on the frame $k$ between end guides $k'$, and when the frame is turned down in the position shown in Fig. 1 said pallets may be slid outward between said guides and removed from the machine. To facilitate this sliding movement, the frame K is preferably cut away at $k^2$ to form openings, through which the hands of the operator may be inserted in grasping the pallet J.

The various plates which constitute the mold are locked in rigid relation to each other during the molding operation by providing latches L on the swinging end plates F, which engage with keepers M on the frame H. These latches when in engagement with the keepers will rigidly secure the plates F to the frame H, and the plates G, overlapping the plate I and extending between the plates D and J, will impart great rigidity to the structure.

It has been stated that the cores C are secured to the slidable frame B and are moved by the latter into or out of the core-openings $f$ in the plate D. For moving the frame B, I preferably provide a rock-shaft N, having rock-arms O at its opposite ends and connected by links P with the frame B. One or both of the rock-arms O is provided with a socket O' at its upper end, into which an extension-lever Q may be inserted, by means of which the shaft may be rocked and movement imparted to the frame B. Thus the cores may be quickly projected into and withdrawn from the mold.

The parts being thus constructed, their operation is as follows: The mold is adjusted to a size corresponding to the block required first by selecting a plate D of a width corresponding to the width of the wall and having suitable core-apertures for the size of cores required. This plate is then secured by the screws $h$ to the frame E, and the latter is vertically adjusted to bring the lower edge of the plate D against the top of the bed. The clamping-screws $g^4$ are then tightened to hold the frame E in rigid position. This adjustment of the frame E will properly adjust the swinging end frames F, to which facing-plates G of suitable dimensions may next be secured. The cores C are adjusted into registration with the core-openings $f$ in the plate D by vertically adjusting the cross-bar $e$ and clamping it in adjusted position by the bolts $d^2$, and where necessary the cores may also be adjusted longitudinally of the cross-bar $e$ by shifting the clamping-screws $e'$. A face-plate I, having the desired pattern, is secured to the brackets $j$, and the pallet J is placed in position between the guides $k'$. This pallet is adjusted to have its upper edge flush with the upper edges of the plates D and F by placing a supporting-block $J'$ in the slot $j'$, as illustrated in Fig. 3. The adjustments above described having been accomplished, the machine is ready for operation. In this the operator arranges the parts as illustrated in Fig. 2, locking the end plates F to the frame H by the latches L and moving the frame B by the lever Q, so as to insert the cores C through the core-openings $f$ and against the pallet J. The plastic material is then placed in the mold and suitably tamped, after which a reverse movement of the lever Q will retract the cores, and the latches L are then unfastened, the end plates F swung outward, and the frame G rotated through substantially ninety degrees through the medium of the lever $H^5$. When this operation is complete, the molded block is resting upon the pallet with its front face in contact with the plate I. To remove it, the pallet is slid outward between the guides $k'$ and is lifted from the frame, after which the operation may be repeated.

As illustrated in Fig. 2, the pallet J is of greater width than the block; but, as has been described, it is immaterial whether it is of the same or of greater width.

To support the cores more rigidly in the mold, the pallet may be provided with lugs $m$, which extend beneath the inner end of the core when the latter is in place within the mold, as illustrated in Fig. 2.

What I claim as my invention is—

1. In a machine for molding blocks, the combination with a mold-bottom, of a mold side mounted to overlap the edge of said mold-bottom and vertically adjustable to extend to different heights thereabove, and a mold side hinged to said first-named mold side for the purpose described.

2. In a machine for molding blocks, the combination with a bed, of a mold side hinged to swing against the side of said bed and overlapping the same, and a member to which said side is hinged vertically adjustable on said bed.

3. In a machine for molding blocks, the combination with a bed, of a plurality of mold sides overlapping the edges thereof, and a common member upon which said sides are mounted vertically adjustable on said bed.

4. In a machine for molding blocks, the combination with a bed, of a plurality of mold sides on opposite sides of said bed and overlapping the edges thereof, and a common member upon which said sides are mounted vertically adjustable upon said bed and constituting a third side of the mold.

5. In a machine for molding blocks, the combination with a bed, of a bottom plate thereon, a vertically-adjustable member, mold sides overlapping the edges of said bed and hinged to swing thereagainst, and lining-plates of variable height secured to said mold sides.

6. In a machine for molding blocks the combination with a stationary bed and a plurality of mold sides mounted thereon, of a pair of adjacent mold-plates secured to each other in angling relation and pivotally mounted upon said bed, whereby they may be swung to exchange their planes of location independently of said mold sides, for the purpose described.

7. In a machine for molding blocks the combination with a stationary bed and a stationary mold side secured thereto, of a pair of mold sides pivotally mounted on the ends of said stationary mold side, a pair of adjacent mold-plates secured to each other in angling relation and pivotally mounted on said bed, whereby they may be swung to exchange their planes of location independently of said mold sides, for the purpose described.

8. In a machine for molding blocks the combination with a stationary bed and a plurality of mold sides mounted thereon, of a pair of adjacent mold-plates secured to each other in angling relation and pivotally mounted on said bed at the intersection of said planes, one of said plates having its free end initially resting on said bed, said plates being arranged to swing on said pivot free of said mold sides and to exchange their planes of location.

9. In a machine for molding blocks the combination with a bed, of a stationary mold side having core-openings and secured to said bed, mold sides mounted on the ends of said stationary mold side, cores mounted on said bed and arranged for reciprocation through said core-openings and a pair of adjacent mold-plates secured to each other in angling relation and pivoted on said bed, for the purpose described.

10. In a machine for molding blocks, the combination with a bed, of a stationary mold side having core-openings and secured to said bed, mold sides mounted on the ends of said stationary mold side, a core arranged to project through said core-openings, a pair of adjacent mold-plates secured to each other in angling relation and pivotally arranged on said bed to be swung independently of said mold sides, and lugs on one of said mold-plates to support the free end of said core, for the purpose described.

11. In a machine for molding blocks the combination with a stationary bed and a plurality of mold sides mounted thereon, of an initially horizontal mold-plate and an initially vertical mold-plate detachably secured thereto, said mold-plates being pivotally mounted to be swung to exchange their planes of location independently of said mold sides, said initially vertical mold-plate being arranged to serve as a pallet to remove the molded block.

12. In a machine for molding blocks the combination with a stationary bed and longitudinally and vertically adjustable core members slidably mounted thereon, of a removable mold side having core-apertures therein and secured to said bed, a pair of mold sides pivotally mounted on said bed to swing on vertical axes, and a pair of adjacent mold-plates secured to each other in angling relation and pivotally mounted on said bed to be swung to exchange their planes of location independently of said mold sides, for the purpose described.

13. In a machine for molding blocks, the combination with a bed, of a vertically-adjustable mold side, a rocking frame mounted upon said bed, a mold-plate secured to said rocking frame and initially resting upon said bed, and a pallet detachably secured to said rocking frame overlapping the edge of the plate thereon, and means for adjusting said pallet to corresponding height to said vertically-adjustable mold-plate.

14. In a machine for molding blocks, the combination with a bed, of a frame vertically adjustable at one side of said bed, a pair of mold sides hinged to opposite edges of said frame to swing adjacent to the ends of said bed and overlap the same, and a mold-plate of variable height secured to said frame and resting upon said bed.

15. In a machine for molding blocks, the combination with a bed, of a rocking frame mounted thereon, a mold-plate secured to said rocking frame and initially resting upon said bed, mold sides vertically adjustably secured to said bed adjacent to the mold-plate thereon, and a pallet constituting the remaining mold side vertically adjustable and removably secured to said rocking frame.

In testimony whereof I affix my signature in presence of two witnesses.

LEVI P. NORMANDIN.

Witnesses:
SIDNEY L. WILTSE,
E. B. WOOD.